Jan. 21, 1964
D. M. H. HAMEL
3,118,710
RESILIENT JOINTS
Filed Feb. 20, 1961
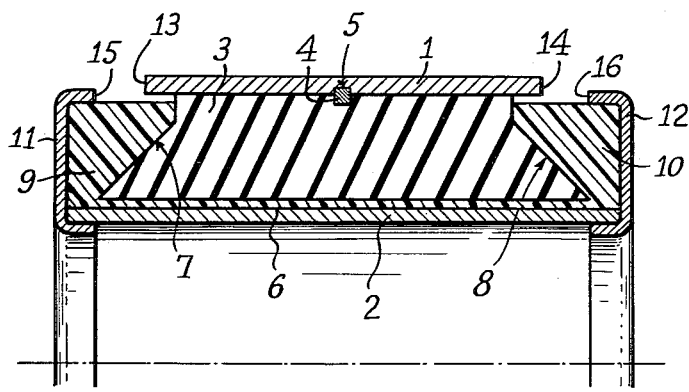
INVENTOR
D.M.H. Hamel
By Holcombe, ...
ATTORNEYS

United States Patent Office

3,118,710
Patented Jan. 21, 1964

3,118,710
RESILIENT JOINTS
Denis Marcel Henri Hamel, St. Mande, Seine, France, assignor to Societe Anonyme dite: Pneumatiques et Caoutchouc Manufacture Kleber Colombes, Colombes, Seine, France
Filed Feb. 20, 1961, Ser. No. 90,298
Claims priority, application France Feb. 22, 1960
5 Claims. (Cl. 308—37)

The present invention relates to resilient joints comprising two coaxial sleeves located one within the other in spaced apart relation and having a mass of elastic material in the space therebetween. Such joints are used as a pivotal or rotatable connection between two members, for example, between two levers or rods, which are angularly movable with respect to one another, and may be used with the suspension and steering rods of automobiles.

Resilient joints of the above type are already known in which the mass of elastic material, for example rubber, is fixed to one of the sleeves, and the free surface of the material is covered with a layer of anti-friction material, such as polytetrafluorethylene, which slides on the other sleeve without appreciable resistance, without requiring a lubricant and without wearing out.

In these joints, the anti-friction material slides on the adjacent sleeve when the torsional force exceeds a certain value, and as a result, these joints do not, in practice, oppose a rotation of large value.

Joints are also known, in which the sleeves have radial projections forming baffles in the elastic material in order to increase the axial resistance. These projections are sometimes formed by split rings which are located in a corresponding groove in the sleeve. This latter arrangement allows the sleeves to be of simple structure and also facilitates the variation of the diameter of the sleeves which is performed after mounting with the purpose of placing the elastic material in a permanent state of compression. These latter joints have a rigidity which becomes excessive when the torsion reaches the certain value.

In these different types of joints, means are provided at the ends of the sleeves for increasing the axial resistance. Under strong axial forces the incompressible elastic material tends to jump out at the ends of the sleeves and deteriorates upon repeatedly contacting the metal members.

The invention has for an object to provide a resilient joint offering substantially no resistance to torsion, but offering a large resistance to axial forces, and in which the relative movements of the metal member do not deteriorate the elastic material.

A joint according to the present invention may comprise an outer sleeve, the inner surface of which has at least one radial projection, preferably constituted by a split ring located in a groove in the sleeve, an inner sleeve, the ends of which are provided with radial extensions for resisting axial forces, and a mass of elastic material occupying the space between the two sleeves and secured to the inner surface of the outer sleeve, the other faces of the mass of elastic material being coated with anti-friction material which is in contact with the inner sleeve and its radial extensions.

The outer sleeve is preferably shorter than the inner sleeve and this gives the mass of elastic material a trapezoidal shape in axial section. The anti-friction material advantageously fills the space defined between the elastic material and the radial extensions of the inner sleeve and thus the elastic material is completely covered by the anti-friction material and cannot creep towards the outside and therefore deteriorate during this creeping. The radial extensions of the inner sleeve may be axially rebated in order more firmly to hold the anti-friction material covering the elastic material.

This construction of joint has the advantage that the elastic material slides on the inner sleeve and not on the outer sleeve. Now, the torque necessary to initiate the sliding is proportional on the one hand to the radius of the surface (distance from the surface to the axis of rotation) and on the other hand to the surface itself. In selecting the inner sleeve for sliding, the surface is smaller and the radius is also smaller. This, therefore, forms two reasons for which the torsional force is weaker: the joint according to the invention will thus only oppose a weak resistance in torsion and will easily enter into rotation. On the other hand the surface for fixing the elastic material on to the outer sleeve is at its maximum and the fixation of the elastic material will be excellent.

On the other hand the free surface of the elastic material is located over the largest diameter and the shearing of the rubber in this region, for a given axial force, will be the weaker the greater the length of the perimeter.

The invention will now be described, by way of example, with reference to the accompanying drawing, which shows an axial half section through a resilient joint constructed in accordance with the present invention.

Referring to the drawing, the joint is principally constituted by an outer sleeve 1, an inner sleeve 2 and a mass of elastic material 3, for example natural or synthetic rubber, located in the space between the sleeves. The outer sleeve has an inner radial projection consisting of a split ring 4, located in an annular groove 5 in the inner surface of the sleeve 1. The rubber is fixed to the sleeve 1, either while being vulcanised, or otherwise, by any suitable treatment.

The outer sleeve 1 is easy to make and its machining is simple. It can be restrained after mounting, the split ring 4 giving no appreciable resistance provided that the distance between the ends of the ring is sufficiently large.

On the inside, the mass of rubber 3 has a layer 6 of an anti-friction material, for example a polymer such as polytetrafluorethylene or a resin reinforced with asbestos. This layer 6 can be fixed to the rubber and slides easily on the sleeve 2 without resistance, without wearing out and with no need for a lubricant.

The lateral faces 7 and 8 of the rubber at the two ends of the sleeve are covered with layers of anti-friction material 9 and 10, respectievly. These layers 9 and 10 are thick enough to retain the rubber firmly and are of triangular shape in section thus allowing the inner sleeve 2 to be made more easily. The radial extensions at the ends of the sleeve 2 are axially rebated and are formed from pressed sheet metal annular members 11 and 12, while the sides or faces 7 and 8 of the rubber are inclined, as shown, and have a conical surface. The ends 13 and 14 of the sleeve 1 are preferably extended beyond the rubber and overlie the anti-friction material which has a suitable play with regard to this sleeve. Thus the rubber is retained on all sides and cannot creep in the course of movement and the forces undergone by the joint. The outer peripheries 15 and 16 of the pressed members 11 and 12 respectively, are folded over above the anti-friction material, as shown, in order to retain it, should it not be rigid enough, and to prevent it from deforming and creeping.

When such a joint is subjected to an axial force the reaction of the rubber will increase very rapidly as it is compressed between the radially projecting split ring 4 and one of the pressed members 11 or 12. The anti-friction layers 9 or 10 are flexible enough to allow the rubber to undergo the slight deformation which will be enough to enable it to oppose the most severe forces to which it may be subjected.

The use of a split ring 4 allows the outer sleeve 1 to be constructed simply but above all it allows the diameter of this sleeve to be easily reduced after vulcanisation, in order that the rubber is maintained in a permanent state of compression in service. It is, in fact, known that rubber works under the best conditions when it is slightly compressed, and lasts much longer. The formation of small cracks which result from tensioning, too often is avoided. In the course of working upon the outer sleeve, the split ring closes up to a certain extent without giving any appreciable resistance.

I claim:

1. Resilient joint comprising two coaxial sleeves located one within the other in spaced apart relation, a mass of elastic material in the space between said sleeves, means securing said mass of elastic material to the outer sleeve, said outer sleeve being of less axial extent than the inner sleeve, and said mass of elastic material having sides sloping axially outwards of the joint towards said inner sleeve from a position inwardly of the edges of said outer sleeve, means extending radially outwards from each end of said inner sleeve, and anti-friction material between the elastic material and said inner sleeve and between said end means and the sides of said mass of elastic material.

2. Resilient joint comprising two coaxial rigid sleeves located one within the other in spaced apart relation, an annular mass of elastic material in the space between said sleeves and secured to the outer sleeve and being of such a radial extent as to leave a space between the inner sleeve and its adjacent surface, said outer sleeve being of less axial extent than the inner sleeve, and said annular mass of elastic material having sides sloping axially outwards of the joint towards said inner sleeve from a position inwardly of the edge of said outer sleeve, at least one radial projection projecting inwardly into the elastic material from said outer sleeve, an annular plate extending radially outwards from each end of said inner sleeve and a layer of anti-friction material in the space between the elastic material and said inner sleeve and between said annular plates and the sides of said annular mass of elastic material, said annular plates having their outer periphery folded inwardly of the joint to engage the outer surface of the anti-friction material to each side of the annular mass of elastic material.

3. Resilient joint comprising two coaxial metal sleeves located one within the other in spaced apart relation, an annular mass of rubber in the space between said sleeves bonded to the outer sleeve and being of such a radial extent as to leave a space between the inner sleeve and its adjacent surface, said outer sleeve being of less axial extent than the inner sleeve, and said annular mass of rubber having sides sloping axially outwards of the joint towards said inner sleeve from a position inwardly of the edges of said outer sleeve, at least one split ring located in an annular groove in the inner surface of said outer sleeve and projecting into said mass of rubber, an annular plate extending radially outwards from each end of said inner sleeve, and a layer of anti-friction material in the space between the rubber and said inner sleeve and between said annular plates and the sides of said annular mass of rubber, said annular plates having their outer periphery folded inwardly of the joint to engage the outer surface of the anti-friction material to each side of the annular mass of rubber.

4. Resilient joint as claimed in claim 3, wherein the anti-friction material is polytetrafluorethylene.

5. Resilient joint as claimed in claim 3, wherein the anti-friction material is a resin reinforced with asbestos.

References Cited in the file of this patent

UNITED STATES PATENTS

| 1,541,276 | Powell | June 9, 1925 |
| 2,765,023 | Fagg et al. | Oct. 2, 1956 |
| 2,824,772 | Petersen | Feb. 25, 1958 |
| 3,039,831 | Thomas | June 19, 1962 |

FOREIGN PATENTS

| 1,204,848 | France | Aug. 10, 1959 |
| 1,236,910 | France | June 13, 1960 |